United States Patent Office 2,771,349
Patented Nov. 20, 1956

2,771,349
STABILIZATION OF ORGANIC COMPOUNDS

Ralph B. Thompson, Hinsdale, Ill., assignor to Universal Oil Products Company, Des Plaines, Ill., a corporation of Delaware No Drawing. Application November 23, 1953,
Serial No. 393,945

19 Claims. (Cl. 44—75)

This invention relates to the stabilization of organic compounds which tend to deteriorate in storage or in use due to oxidation or other reactions.

The novel method of the present invention may be utilized for the stabilization of various organic materials which are unstable in storage, during treatment and/or in use, and include motor fuel, jet fuel, diesel oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. These materials are adversely affected by oxygen, with the resultant formation of undesirable gum, discoloration, rancidity or other deleterious reaction products.

The invention is particularly applicable to the stabilization of motor fuel and still more particularly unsaturated gasolines including cracked gasoline, polymer gasoline, etc. In storage or during transportation and/or treatment, these unsaturated gasolines tend to form undesirable gums and/or undergo discoloration. The invention is also applicable to the treatment of aviation gasolines which tend to undergo deterioration due to the addition of tetraethyl lead fluid or due to other components in the gasoline.

The invention is also particularly applicable to the stabilization of edible and inedible fats and oils, which may be of animal, vegetable or mineral origin and which tend to become rancid especially during long periods of storage prior to use. Typical representatives of the edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc. In still another embodiment the inhibitor may be incorporated in materials which contact food products as, for example, paraffin wax used to coat containers for food products, cardboard or other paper products used for packaging food products, etc.

In one embodiment the present invention relates to a method of stabilizing an organic material against deterioration which comprises incorporating therein an inhibitor comprising an amino-1,8-methylenedioxynaphthalene.

In a specific embodiment the present invention relates to a method of stabilizing a fatty material which comprises incorporating therein from about 0.0001% to about 1% by weight of 4,5-diamino-1,8-methylenedioxynaphthalene.

In another specific embodiment, the present invention relates to a method of stabilizing cracked gasoline which comprises incorporating therein from about 0.0001% to about 1% by weight of 2,7-diamino-1,8-methylenedioxynaphthalene.

The novel inhibitor of the present invention may be illustrated by the following general formula:

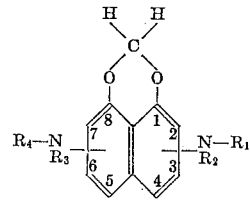

in which $R_1$, $R_2$, $R_3$ and $R_4$ are each independently selected from the groups consisting of hydrogen, hydrocarbon and substituted hydrocarbon groups. The hydrocarbon groups include alkyl, alkenyl, cycloalkyl, cycloalkalkyl, alkcycloalkyl, aryl, aralkyl, alkaryl, etc. The substituted hydrocarbon groups may include groups containing oxygen, nitrogen and/or sulfur. Preferred inhibitors comprising 2,7- and 4,5-diamino-1,8-methylenedioxynaphthalenes and mixtures thereof. It is a particular advantage that the mixture of diamino-1,8-methylenedioxynaphthalenes may be employed satisfactorily because this avoids the added expense of separating the isomers.

While the 2,7- and 4,5-diamino-1,8-methylenedioxynaphthalenes are preferred, it is understood that the broad scope of the present invention includes the use of diamino-1,8-methylenedioxynaphthalenes in which the amino groups are in other positions. Thus, 3,6-diamino-1,8-methylenedioxynaphthalene may be employed or, in other cases, the inhibitor compounds may include diamino-1,8-methylenedioxynaphthalenes in which the amino groups are in positions: 2,5-, 2,6-, 3,5-, etc. While it is preferred that the amino substituents are attached to different benzene rings, in some cases the amino groups may be attached to the same ring and include compounds having these amino groups in the positions 2,3-, 2,4-, and 3,4-.

Referring to the general formula hereinbefore set forth, where $R_1$ and $R_3$ are alkyl groups, the inhibitor compound will comprise dimethylamino-1,8-methylenedioxynaphthalene, diethylamino-1,8-methylenedioxynaphthalene, dipropylamino-1,8-methylenedioxynaphthalene, dibutylamino - 1,8 - methylenedioxynaphthalene, diamylamino-1,8-methylenedioxynaphthalene, dihexylamino-1,8-methylenedioxynaphthalene, diheptylamino-1,8 - methylenedioxynaphthalene, dioctylamino-1,8-methylenedioxynaphthalene, dinonylamino-1,8-methylenedioxynaphthalene, didecylamino-1,8-methylenedioxynaphthalene, diundecylamino-1,8 - methylenedioxynaphthalene, didodecylamino-1,8-methylenedioxynaphthalene, etc. It generally is preferred that the alkyl groups are of branched chain structure and thus may be iso, secondary and/or tertiary. Where $R_1$ and $R_3$ comprise groups containing cycloalkyl substituents, the inhibitor will include compounds as dicyclohexylamino-1,8-methylenedioxynaphthalene, dicyclohexylmethylamino-1,8 - methylenedioxynaphthalene, dicyclohexylethylamino-1,8 - methylenedioxynaphthalene, dicyclohexylpropylamino-1,8-methylenedioxynaphthalene, dicyclohexylbutylamino-1,8 - methylenedioxynaphthalene, etc., dimethylcyclohexylamino-1,8-methylenedioxynaphthalene, diethylcyclohexylamino-1,8-methylenedioxynaphthalene, dipropylcyclohexylamino - 1,8 - methylenedioxynaphthalene, dibutylcyclohexylamino-1,8-methylenedioxynaphthalene, etc. Where the substituent contains an aryl group, the inhibitor will include such compound as diphenylamino - 1,8 - methylenedioxynaphthalene, ditolylamino-1,8-methylenedioxynaphthalene, dixylylamino-1,8-methylenedioxynaphthalene, etc., dibenzylamino - 1,8 - methylenedioxynaphthalene, diphenylethylamino - 1,8- methylenedioxynaphthalene, diphenylpropylamino - 1,8 methylenedioxynaphthalene, diphenylbutylamino - 1,8-methylenedioxynaphthalene, etc.

In some cases the inhibitor compound may contain one or more hydrocarbon or other substituents attached to the ring. These substituents preferably comprise alkyl groups, including methyl, ethyl, propyl, butyl, amyl, hexyl, heptyl, octyl, etc., and still more particularly are of branched chain structure. In other cases the alkyl group may have nitrogen, oxygen, and/or sulfur attached thereto. In still other cases, the substituent may comprise a cyclic radical including cyclohexyl, phenyl, heterocyclic ring groups containing oxygen, nitrogen, and/or sulfur in the ring, etc.

The inhibitor compounds of the present invention may be prepared in any suitable manner. In one method, the disodium salt of 1,8-dihydroxynaphthalene may be reacted with methylene chloride to form the methylene ether of peri-dihydroxynaphthalene, which then is nitrated to form the dinitro derivative and finally is reduced to the diamino - 1,8 - methylenedioxynaphthalene. In another method, the disodium salt of 1,8-dihydroxynaphthalene may be reacted with methylene sulfate to form the methylene ether and then nitrated and reduced as hereinbefore set forth.

It is apparent that numerous compounds may be prepared and utilized in accordance with the present invention. However, all these compounds are not necessarily equivalent and may be of different effectiveness in the same or different substrates.

The inhibitor compound of the present invention generally is incorporated in the organic material to be stabilized in an amount of below about 1% by weight and preferably in an amount within the range of from about 0.0001% to about 1% by weight. When used in gasoline, it is understood that the inhibitor compound may be utilized in conjunction with various dyes, synergists, metal deactivators, antiknock agents, such as tetraethyl lead, iron carbonyl, etc., rust inhibitors, etc. When used in edible fats and oils, the inhibitor compound may be used in conjunction with synergists such as citric acid, phosphoric acid, ascorbic acid, etc., and/or in combination with other inhibitors and other compounds added for specific purposes. The inhibitor may be utilized as such or in a suitable solvent, including hydrocarbons, alcohols, glycols, ethers, ketones, etc. When desired, the inhibitor compound may be marketed as a solution along with other additives to be incorporated in the organic materials.

The following examples are introduced to illustrate further the novelty and utility of the present invention but not with the intention of unduly limiting the same.

*Example I*

The gasoline used in this example was a reformed naphtha having a normal induction period of 80 minutes. A mixture of 2,7- and 4,5-diamino-1,8-methylenedioxynaphthalenes was prepared in substantially the same manner as hereinbefore set forth, and 0.02% by weight of this mixture was incorporated in another sample of the gasoline. This served to increase the induction period of the gasoline to 225 min.

*Example II*

The inhibitor composition of this example comprised a mixture of 2,7-diisopropylamino- and 4,5-diisopropylamino-1,8-methylenedioxynaphthalenes. When added in a concentration of 0.02% by weight to another sample of the gasoline described in Example I, the induction period of the gasoline was increased to 300 min.

*Example III*

The gasoline used in this example was a Pennsylvania cracked gasoline having a normal induction period of 50 min. 0.05% by weight of 2,7-diamino-1,8-methylenedioxynaphthalene was incorporated in the gasoline and this served to increase the induction period thereof to 885 min.

*Example IV*

The inhibitor of the present invention may be utilized for the stabilization of lard having a normal stability period of five hours as determined by the Swift test. This test is described in detail in the article by A. E. King, H. L. Roschen and W. H. Irwin, which appeared in "Oil and Soap," vol. X, No. 6, pages 105–109 (1933), and modified as described in the article by R. W. Reimenschneider, J. Turer and R. M. Spec, which appeared in "Oil and Soap," pages 169–171 (September 1943). In general this test comprises bubbling air through a sample of lard and determining rancidity organoleptically and by peroxide numbers. The results of these tests are reported as A. O. M. stability period, which is the number of hours required to reach a peroxide number of 20. The stability period of the lard may be increased by incorporating therein 0.02% by weight of 4,5-disecondary-butylamino-1,8-methylenedioxynaphthalene.

*Example V*

This example illustrates the use of an inhibitor compound of the present invention in the stabilization of rubber. 0.8% by weight of a mixture of 2,7-didodecylamino- and 4,5-didodecylamino-1,8-methylenedioxynaphthalene is added to the latex produced from the emulsion polymerization of butadiene and styrene, after which the latex is dried. The rubber so produced will be improved as to retention of color, strength, elasticity, etc.

I claim as my invention:

1. An organic material normally subject to oxidative deterioration containing from about 0.0001% to about 1% by weight of a 2,7-diamino-1,8-methylenedioxynaphthalene.

2. An organic material normally subject to oxidative deterioration containing from about 0.0001% to about 1% by weight of a 4,5-diamino-1,8-methylenedioxynaphthalene.

3. Organic material normally subject to oxidative deterioration in storage containing as an additive to retard said deterioration, an antioxidizing amount of an inhibitor comprising a diamino-1,8-methylenedioxynaphthalene.

4. Organic material normally subject to oxidative deterioration containing from about 0.0001% to about 1% by weight of a 2,7-diamino-1,8-methylenedioxynaphthalene.

5. Organic material normally subject to oxidative deterioration containing from about 0.0001% to about 1% by weight of a 4,5-diamino-1,8-methylenedioxynaphthalene.

6. Organic material normally subject to oxidative deterioration containing from about 0.0001% to about 1% by weight of a 1,8-methylenedioxynaphthalene having two alkylamino groups.

7. Organic material normally subject to oxidative deterioration containing from about 0.0001% to about 1% by weight of a 1,8-methylenedioxynaphthalene having two cycloalkylamino groups.

8. Organic material normally subject to oxidative deterioration containing from about 0.0001% to about 1% by weight of a 1,8-methylenedioxynaphthalene having two phenylamino groups.

9. Hydrocarbon material normally subject to oxidative deterioration containing from about 0.0001% to about 1% by weight of a diamino-1,8-methylenedioxynaphthalene.

10. Cracked gasoline normally subject to oxidative deterioration in storage containing from about 0.0001% to about 1% by weight of 2,7-diamino-1,8-methylenedioxynaphthalene.

11. Cracked gasoline normally subject to oxidative deterioration in storage containing from about 0.0001% to about 1% by weight of 4,5-diamino-1,8-methylenedioxynaphthalene.

12. Cracked gasoline normally subject to oxidative deterioration in storage containing from about 0.0001% to about 1% by weight of a 1,8-methylenedioxynaphthalene having two isopropylamino groups.

13. Cracked gasoline normally subject to oxidative deterioration in storage containing from about 0.0001% to about 1% by weight of a 1,8-methylenedioxynaphthalene having two secondary butylamino groups.

14. Rubber normally subject to oxidative deterioration in storage containing from about 0.0001% to about 1% by weight of a diamino-1,8-methylenedioxynaphthalene.

15. Styrene normally subject to oxidative deterioration in storage containing from about 0.0001% to about 1% by weight of a diamino-1,8-methylenedioxynaphthalene.

16. Wax normally subject to oxidative deterioration in storage containing from about 0.0001% to about 1% by weight of a diamino-1,8-methylenedioxynaphthalene.

17. Organic material normally subject to oxidative deterioration containing an antioxidizing amount of 2,7-diamino-1,8-methylenedioxynaphthalene.

18. Organic material normally subject to oxidative deterioration containing an antioxidizing amount of 4,5-diamino-1,8-methylenedioxynaphthalene.

19. Gasoline normally subject to oxidative deterioration containing an antioxidizing amount of a diamino-1,8-methylenedioxynaphthalene.

References Cited in the file of this patent
UNITED STATES PATENTS

| | | |
|---|---|---|
| 1,971,329 | Calcott et al. | Aug. 28, 1934 |
| 2,065,568 | Elley et al. | Dec. 29, 1936 |